United States Patent [19]

Rogers et al.

[11] Patent Number: 4,847,062
[45] Date of Patent: Jul. 11, 1989

[54] PROCESS FOR PRODUCTION OF SODIUM CYANIDE

[75] Inventors: Janet M. Rogers, Cordova, Tenn.; Harold F. Porter, Hockessin, Del.

[73] Assignee: E. I. Du Pont De Nemours and Company, Wilmington, Del.

[21] Appl. No.: 100,731

[22] Filed: Sep. 24, 1987

[51] Int. Cl.$^4$ .............................................. C01C 3/10
[52] U.S. Cl. ....................................................... 423/379
[58] Field of Search ........................................... 423/379

[56] References Cited

U.S. PATENT DOCUMENTS

| 1,531,123 | 3/1925 | Mittasch et al. | |
| 2,616,782 | 11/1952 | Cain. | |
| 2,708,151 | 5/1955 | McMinn, Jr. | 23/79 |
| 2,726,139 | 12/1955 | Oliver | 23/79 |
| 2,993,754 | 7/1961 | Jenks et al. | 23/79 |
| 3,365,270 | 1/1968 | Guerin | 423/379 |
| 3,619,132 | 11/1971 | Mann et al. | 23/79 |
| 4,083,935 | 4/1978 | Makar | 423/379 |

FOREIGN PATENT DOCUMENTS

537744  3/1957  Canada ............................. 423/379

Primary Examiner—John Doll
Assistant Examiner—Wayne A. Langel
Attorney, Agent, or Firm—Craig H. Evans

[57] ABSTRACT

A process for producing anhydrous sodium cyanide crystals by absorbing hydrogen cyanide synthesis gas that contains oxides of carbon and water in aqueous sodium hydroxide and crystallizing the sodium cyanide solution that results from the absorption. The sodium carbonate that forms in the absorption is not removed prior to crystallization.

7 Claims, 3 Drawing Sheets

PROCESS FOR PRODUCTION OF SODIUM CYANIDE

FIELD OF INVENTION

This invention relates to the production of anhydrous sodium cyanide crystals by the direct neutralization of sodium hydroxide with impure hydrogen cyanide gas which contains carbon dioxide followed by crystallization and separation of the crystals.

BACKGROUND

Sodium cyanide (NaCN) has a variety of uses. For example, it is used in electroplating, treating metal surfaces, extracting and recovering metals from ores, and chemical uses.

Sodium cyanide (NaCN) for these uses is known to be produced by the so-called wet process or the neutralization of hydrogen cyanide (HCN) with sodium hydroxide (NaOH). The HCN is added both in the form of a gas or liquid, and the NaOH is added as an aqueous solution to form an aqueous NaCN solution. Solid NaCN crystals are formed during evaporation of the aqueous NaCN solution. These crystals can be separated and dried to produce an anhydrous NaCN product, which is generally compacted into briquettes for ease in shipment and handling.

Most often, producers use substantially pure anhydrous HCN to react with substantially pure NaOH generally fed as a 50% solution to the reactor. U.S. Pat. No. 2,708,151 to McMinn, Jr. and U.S. Pat. No. 2,726,139 to Oliver teach processes that use substantially pure HCN.

HCN is produced commercially by various processes well known in the art. With several of the known processes (for example, the Andrussow process, described in U.S. Pat. Nos. 1,934,838 and 1,957,749, which catalytically reacts methane, ammonia and air), the synthesis product is a mixture of components, including the desired HCN as well as water, unreacted ammonia, hydrogen, nitrogen and oxides of carbon. Where substantially pure HCN is required, complicated and expensive rectification and isolation procedures are necessary to provide a satisfactory product.

Since there would be considerable savings in investment and operating cost if the rectification and isolation procedures needed to purify HCN could be eliminated, there have been numerous attempts to use impure HCN gas to produce an aqueous cyanide solution susceptible to conversion to anhydrous NaCN by evaporative crystallization. When HCN synthesis gas is directly absorbed in NaOH, the aqueous solutions produced contain measurable quantities of impurities absorbed from the impure gases.

One of the primary impurities in the aqueous solution is sodium carbonate formed by reaction of carbon dioxide with the NaOH neutralizing agent. Sodium carbonate so formed is soluble in the saturated NaCN solution formed to about 1.5% by weight. During evaporation and crystallization of NaCN, the sodium carbonate will crystallize and become an impurity in the anhydrous NaCN product. In addition, since sodium carbonate has an inverse solubility relationship in aqueous NaCN solutions, less will stay in solution as the temperature of the solution is increased. Thus, it would be expected that sodium carbonate would precipitate and tend to plug heat exchangers where surface temperatures can be high, for example, the evaporator calandria heating surface would be expected to foul. As that heating surface begins to foul, heat transfer would be made more difficult thereby increasing the cost of operation. As more fouling occurs, one would expect eventual interruption of operation of the evaporative crystallizer.

U.S. Pat. No. 3,619,132 to Mann et al. uses impure HCN gas, but avoids sodium carbonate problems by absorbing impure HCN gas that is free of carbon dioxide in alkali hydroxide. Mann et al. use spacially separated steps of absorbing at subatmospheric pressure and crystallizing at still lower pressure.

Others have attempted to employ HCN containing carbon dioxide as an impurity, but remove the sodium carbonate prior to crystallization.

U.S. Pat. No. 2,616,782 to Cain teaches a process in which an oxide of calcium is added to the NaOH in an amount at least equivalent to the carbon dioxide in the HCN gas and the temperature is controlled at less than 196° F. (about 91° C.). The process is to reduce contamination due to sodium carbonate which forms by reaction of the carbon dioxide with the NaOH. Calcium carbonate, which is formed instead of the sodium carbonate, is insoluble is the NaCN solution and can be removed by filtration prior to crystallization.

U.S. Pat. No. 1,531,123 to Mittasch et al. also teaches a process for using HCN gas containing carbon dioxide. The process employs concentrated NaOH, low temperature (preferably less than 40° C.) and adds ammonia to precipitate the sodium carbonate formed prior to crystallization.

In addition to the problems associated with carbon dioxide being present, water in the HCN synthesis gas presents other difficulties. The synthesis gases normally contain substantial quantities of water, most of which is condensed in the absorber at normally low absorption temperatures. The condensed water adds to the water load (water of reaction plus water from aqueous NaOH) that the crystallizer must handle. When the excess water is evaporated in the crystallizer, more water vapor must be vented. Increased venting of water vapor tends to strip additional HCN vapors from the solution. The result is a disturbance of the equilibrium of the neutralization reaction. NaCN then reacts with water to form HCN and NaOH to bring the reaction back to equilibrium. This leads to lost yield, additional scrubbing requirements to remove the HCN in the vapors, and an increase of NaOH content in the evaporator (or crystal mother liquor). When levels of NaOH in the crystal mother liquor are high, the dry NaCN crystals become coated with NaOH. Since the NaOH is more hygroscopic than the NaCN, storage and handling of the anhydrous product becomes more difficult. Exclusion of atmospheric air from storage and shipping containers to avoid water absorption becomes even more critical and water absorption, when it does occur, leads to caking, for example.

Typically, the NaCN is formed into briquettes by dry compression methods and shipped to users who generally dissolve the NaCN in water to make an aqueous solution to be used in their process. For example, for use in the extraction of metals from ores, the solid NaCN product is made into a dilute solution containing about 23 weight percent NaCN. Extractors generally also add a base to raise the pH to minimize cyanide ionization thereby reducing evolution of cyanide vapors. To be acceptable, crystals must have a high enough NaCN concentration such that, when diluted, the weight percent NaCN is high enough for the intended purpose. For example, an assay of say 90 to 95% NaCN would be acceptable for metal extraction so long as the impurities do not interfere with crystal properties, particularly those that effect the storage and shipping ability and the effectiveness of the anhydrous NaCN in performing its intended purpose.

SUMMARY OF INVENTION

The present invention is a process that makes acceptable anhydrous NaCN crystals that can be efficiently dried and compressed into briquettes by directly absorbing HCN synthesis gas, which contains oxides of carbon, in aqueous NaOH without the addition of aides to precipitate the sodium carbonate formed when the NaOH reacts with the oxide of carbon. The NaCN solution formed is passed directly to a crystallizer without removal of any sodium carbonate that is formed. The vent gas from the crystallizer preferably is scrubbed with NaOH to remove the HCN which is preferably recycled to the absorber. Preferably, the crystallizer is a classifying crystallizer in which small crystals including sodium carbonate rise to the top and a slurry of larger NaCN crystals are removed from the bottom. The smaller crystals preferably are recycled to the absorber. The NaCN crystal slurry from the crystallizer is fed to a solids/liquid separator of standard design to dewater the crystals. The dewatered crystals are then dried and some or all the mother liquor from the separator is recycled to the absorber when the crystallizer is a nonclassifying crystallizer. When a classifying crystallizer is employed, the mother liquor is preferably recycled to the crystallizer from the separator and the slurry of small crystals is recycled to the absorber. Another preferred embodiment is to simultaneously absorb impure HCN synthesis gas in aqueous NaOH and crystallize is an single bsorber-crystallizer.

DETAILED DESCRIPTION OF THE INVENTION

The invention employs direct absorption of the HCN synthesis gas, which contains, among other components, water, oxides of carbon, and inerts,in aqueous NaOH. The HCN synthesis gas is fed to the absorber directly from the HCN converter through a waste heat boiler. The temperature of the gas can range from about 70° C. to about 600° C. depending on the design of the waste heat boiler. The temperature may be increased or decreased as needed. Preferably, the temperature of the HCN synthesis gas to the process of this invention should be 70° C. to 300° C.

HCN processes can be operated so as to control, within limits, the concentration of the components of the synthesis stream. Preferably, the HCN synthesis is controlled so as to minimize the oxides-of-carbon content, which preferably should be controlled to between 0.5 and 1.5 weight percent.

The process can be run batchwise, but continuous operation is preferred.

The aqueous NaOH added to the absorber can be any concentration, preferably 50 weight percent or higher NaOH. It is necessary to maintain excess alkalinity in the absorbing cyanide solution in order to prevent HCN from polymerizing during the absorption operation. Continuous operation permits controlling the alkalinity at a low level. In a continuous absorption free NaOH should be as low as possible to minimize carbon dioxide absorption and to permit sodium carbonate to react with the HCN but high enough to avoid polymer formation. Lower NaOH concentrations can be used when the temperature is low and when sodium carbonate is in the system. The alkalinity should be controlled so that the percent NaOH does not fall below 0.1 weight percent. Preferably, the percent NaOH should be controlled at 0.1 to 3 weight percent, and more preferably at 0.1 to 0.5 weight percent. NaOH concentration can be controlled by pH.

Direct absorption of synthesis gases in NaOH solutions is advantageously conducted at temperatures in the range of 30° C. to about 80° C. Keeping the temperature low reduces the tendency for HCN to polymerize and minimizes decomposition of NaCN to ammonia and sodium formate, which wuuld result in a loss of yield as well as contamination of the NaCN product. Since the tendency to polymerize is reduced at lower temperatures, the excess alkalinity necessary to avoid polymerization is lower, thereby permitting production of NaCN solutions of higher purity.

Higher absorber temperatures can be used with commensurate energy savings, but an increase in impurities would be expected. One skilled in the art will be able to adjust temperature based on purity needs. Also, as the absorption temperature increases, more and more water will be carried out of the absorber with the inerts until finally more will be carried out than is entering with the synthesis gas, aqueous NaOH and water of reaction. As the absorber solution becomes saturated, NaCN crystals will form in the absorber. In a standard absorber such as a packed or plate column, this is unsatisfactory since plugging will occur. In this case, it is preferred to control the temperature at that level which will produce a near-saturated NaCN solution.

In a preferred embodiment of this invention, the absorber is of such construction that plugging is avoided (for example, a baffle column). In this case, it is preferred to simultaneously absorb and crystallize by allowing the absorption temperature to rise to a temperature that will cause the water that enters with the synthesis gas or NaOH or is generated in the neutralization to evaporate. Preferably the temperature should be about 70° C. to about 100° C. and more preferably 70° C. to 85° C. The HCN synthesis operation can be adjusted to provide all the heat requirements for simultaneous absorption and crystallization.

The absorber should be operated at close to atmospheric pressure. Pressures lower than atmospheric pressure would be desirable since lower temperature operation would be possible with resulting lower formate formation and lower required NaOH concentration to prevent polymerization. Lower NaOH concentration would reduce carbon dioxide absorption. But, with pressures lower than atmospheric, operating difficulties with the vent system would be expected. Therefore, the preferred pressure of operation is between 0 and 5 psig.

No additives, such as calcium oxide, to facilitate removal of sodium carbonate are needed in the absorber.

The HCN stripped by the evaporator water vapors should be recovered and utilized in the process for reasons of economics and environmental control. The HCN that exits with the water vapors should be continuously replaced to maintain equilibrium avoiding the high levels of NaOH in the evaporator mother liquor that result when NaCN reacts with the water to produce HCN and NaOH. High NaOH concentrations cause reduced caustic yield (less NaCN is produced than theoretically should be based on the initial NaOH concentration), lower product purity and more sodium carbonate precipitation. Increased sodium carbonate precipitation can present troublesome evaporator calandria fouling problems.

We have found it advantageous to recycle all or part of crystal mother liquor removed from the crystals in a separator to the absorber, rather than retaining it in the evaporative crystallizer system as is normal practice in operations of this type. That portion of the sodium carbonate which is in solution is recycled to the absorber, where it will react with hydrogen cyanide to produce NaCN and sodium bicarbonate. In turn, the stripping action of the inert gases in the absorber results in reconversion of the sodium bicarbonate to sodium carbonate, with the stripped carbon dioxide being largely lost in the absorber exit gases.

Figure 1:
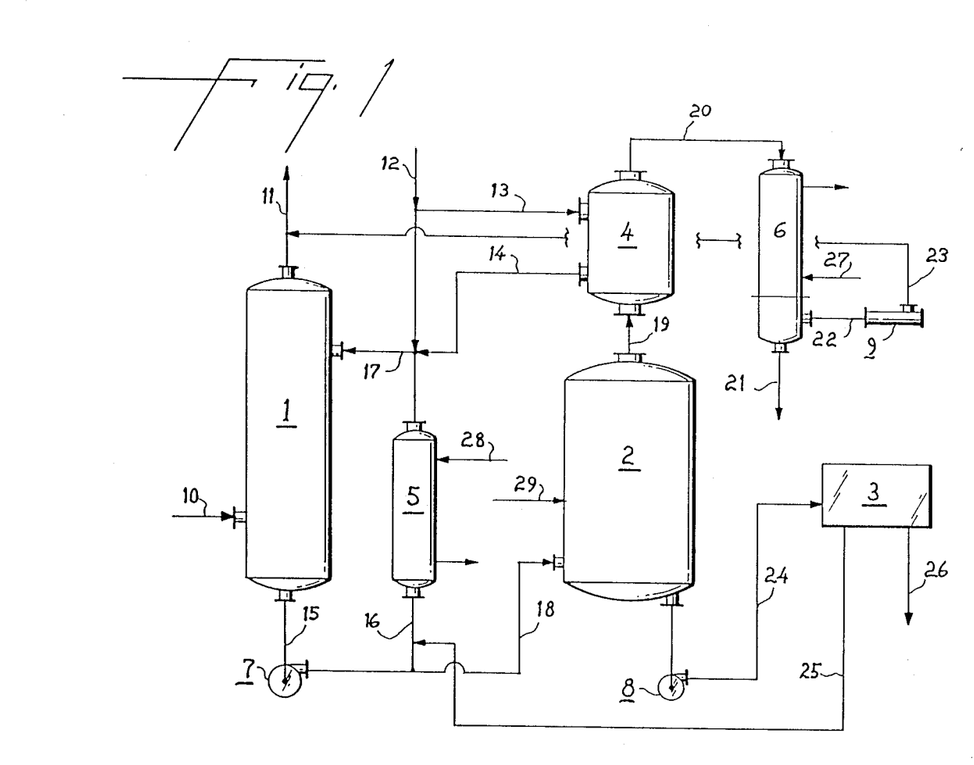
FIG. 1 is a diagrammatic representation of a suitable combination of apparatus for practicing the invention with a standard nonclassifying crystallizer.

A more complete understanding of the present invention using a standard absorber with recycle of mother liquor to the absorber and absorption of HCN vapors from the evaporator and recycle to the absorber may be had by reference to FIG. 1.

The absorber vessel 1 has an external liquid circulating loop consisting of pump 7 and heat exchanger 5. Synthesis HCN gas enters absorber 1 through line 10. Vapors from the absorber are vented to a pollution control unit such as a flare stack through line 11. Aqueous 30 to 50 weight percent NaOH is added through line 12. In one mode of operation, the NaOH is diverted to crystallizer absorber 4 to absorb HCN vapors in the water vapors exiting the crystallizer. The NaOH with absorbed HCN is returned to absorber 1 through line 14. Alternatively, if the HCN vapors are not to be absorbed for return to the absorber, the NaOH can be added directly to the absorber 1 through line 17. The NaCN solution produced in absorber 1 is removed from the bottom of the external liquid circulating loop and fed to the evaporative crystallizer 2 through line 18 as a 30 to 42 weight percent NaCN solution. Water vapor removed in the crystallizer exits to absorber 4 through line 19, the HCN is scrubbed and HCN-free water vapor exits through line 20 and is condensed in condenser 6. Condensate exits through line 21. The non-condensible gases are compressed by vacuum pump 9, which maintains required pressure in crystallizer system (usually 50 to 100 millimeters of mercury absolute) and exhausts gases through line 23 to absorber vent line 11 and hence to pollution control unit such as a flare stack. Crystal slurry produced in crystallizer 2 is delivered to solids/liquid separator 3 through pump 8 and line 24. Crystals are discharged from separator 3 through line 26 to product drying system. The mother liquor is returned through line 25 to absorber 1, where excess NaOH is neutralized and sodium carbonate content is reacted to produce NaCN (alternatively, all or part of the mother liquor could be returned to the crystallizer). Cooling water or other coolant is supplied to heat exchangers 5 and 6 through lines 28 and 27 respectively. Steam to crystallizer 2 calandria enters through line 29.

Another, and generally preferred, embodiment of the present invention utilizes a classifying crystallizer. A classifying crystallizer has a vaporizing section and a classifier section. Smaller crystals are removed from the top of the classifier section of the crystallizer and larger crystals are removed from the bottom of the classifier section. Improved NaCN crystal physical properties can be expected, that is, crystal size should be larger and dewatering and compacting should be easier. In addition to improvement of crystal physical properties, the classification feature serves to return to the absorber solid-phase sodium carbonate, formed during concentration, where it will dissolve and be converted to NaCN rather than separated as part of the anhydrous NaCN product. This is possible since the anhydrous sodium carbonate crystals are small and readily separable from the larger NaCN crystal product.

When employing a classifying crystallizer, mother liquor removed from the crystals in the separator are preferably recycled through the crystallizer to the absorber carrying both soluble and solid-phase sodium carbonate to the absorber along with fine NaCN crystals.

Figure 2:
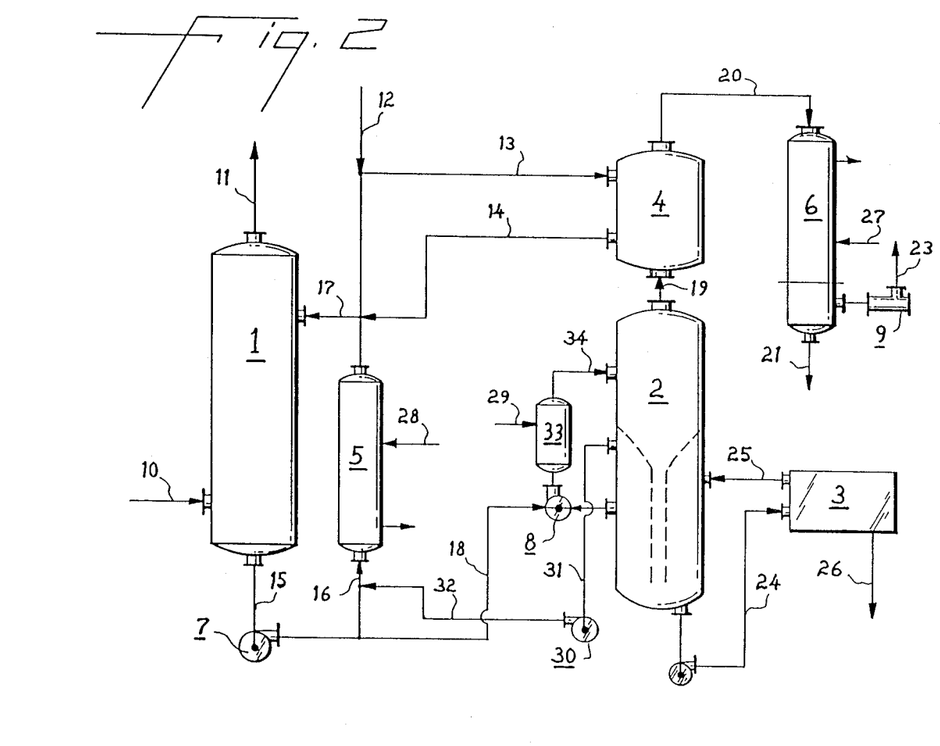
FIG. 2 is a diagrammatic representation of a suitable combination of apparatus for practicing the invention with a classifying crystallizer.

Incorporation of the fine particle destruction feature of a classifying crystallizer may be better understood by reference to FIG. 2. This Figure shows recirculation of mother liquor from the separator through the crystallizer back to the absorber.

The classifying crystallizer 2 consists of a vaporizer section at the top with a crystal classifier section at the bottom of the vessel. Crystal slurry is circulated from the absorber 1 through pump 7 and line 18 and from the classifier section of the crystallizer by pump 8 through calandria 33, where it is heated before entering the vaporizer section of crystallizer 2. A liquid stream containing only the small crystal fraction, which contains small NaCN crystals and sodium carbonate crystals is withdrawn from near the top of the classification section of crystallizer 2 through line 31 by pump 30 and is returned to the absorber 1 circulating loop through line 32. Mother liquor from separator 3 is returned to the crystallizer classification section through line 25.

Another embodiment of the invention incorporates all of the functions involved in absorption of hydrogen cyanide from synthesis gases, evaporation and crystallization of anhydrous NaCN into a single process step requiring only one major process vessel, an absorber-crystallizer. The absorber-crystallizer must be of open design such as a baffle column. To accomplish simultaneous absorption and crystallization, it is necessary to operate the absorber-crystallizer at temperatures sufficiently high to vaporize the water entering the vessel with the NaOH or HCN synthesis gas plus the water of reaction. This temperature should be as low as possible so as to minimize the formation of sodium formate. Temperatures of about 70° C. to 100° C. will be needed when the absorber pressure is near atmospheric and the synthesis gas contains substantial quantities of water. Control can be exercised by changing the HCN synthesis gas temperature. If the temperature is higher than is needed to sufficiently remove water present, the temperature can be lowered or more water can be added. Adding water, however, is generally not desired since it will tend to strip more HCN from the system and the higher temperature will increase contaminants such as sodium formate. Simultaneous absorption and crystallization can result in large savings in investment and operating costs, usually at some sacrifice in product purity and crystal physical properties.

Figure 3:
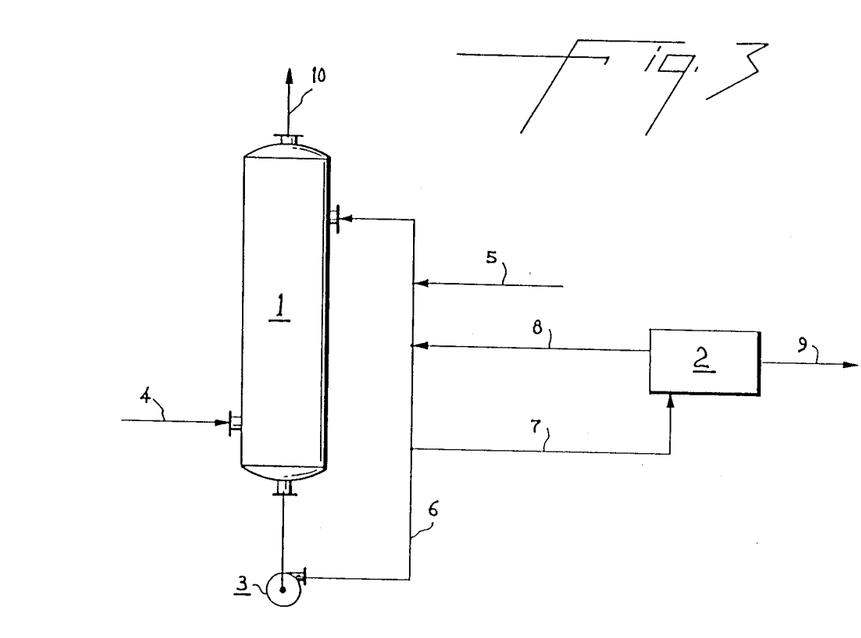
FIG. 3 is a diagrammatic representation of a suitable combination of apparatus for practicing the invention for simultaneous absorption and crystallization in a single major process vessel, an absorber-crystallizer.

Reference to FIG. 3 will give a more complete understanding of simultaneous absorption and crystallization. Absorber 1 is a vessel of open design. It may be a baffle column, for example. Slurry is circulated through line 6 by pump 3. Synthesis gas at a temperature controlled to supply evaporative heat enters through line 4 and aqueous NaOH fed to circulating loop 6 through line 5. NaCN slurry is fed through line 7 to a solid/liquid separator 2 such as a filter or centrifuge. Mother liquor is returned to the absorber through line 8. The separated crystals pass to drying through line 9.

EXAMPLES

The following examples are working examples. They are batch laboratory runs made to determine whether acceptable crystals could be made from HCN synthesis gas and whether the product could be used in metal extraction from ore. No attempt was made to maximize product purity. No recycle of mother liquor to the absorber or absorption and recycle of the HCN vapors from the crystallizer to the absorber was made.

Example 1

HCN was made in a commercial plant by reacting air, ammonia, and natural gas in a converter by the Andrussow process. The converter gas was analyzed and found to contain:
HYDROCYANIC ACID: 9.2 wt. %
WATER: 18.2 wt. %
AMMONIA: 1.8 wt. %
METHANE: 0.1 wt. %
HYDROGEN: 1.3 wt. %
NITROGEN: 62.2 wt. %
CARBON MONOXIDE: 4.6 wt. %
CARBON DIOXIDE: 1.5 wt. %

The converter gas, at about 150° C., was fed to a batch absorber. The batch absorber was six inches in diameter by four feet four inches in height. A removable draft tube was inserted 20 inches into the absorber to provide internal circulation. The absorber had a water cooling jacket to remove the heat in the converter gas and the heat of reaction. Water flow through the jacket was adjusted to control the absorber temperature. The absorber was charged with 30 to 50 weight percent NaOH solution as indicated in Table 1. The HCN converter gas was bubbled through the NaOH solution at about 30 pounds per hour. The absorber temperatures ranged from 30° to 70° C. as shown in Table 1. Samples were removed from the bottom of the absorber through a ram seal flush bottom valve and analyzed for percent NaCN by titration with silver nitrate and for percent NaOH by the procedure discussed below. After most of the NaOH had reacted with hydrocyanic acid (ending NaOH concentration is indicated in Table 1), the NaCN solution was drained from the absorber. Sodium cyanide solutions produced were from 28.0–46.4 weight percent.

The percentages of NaOH and sodium carbonate were determined by the following procedure. Two titrations—one for free NaOH and one for NaOH plus sodium carbonate—were performed. In both cases, the cyanide was first fixed as a silver complex by the addition of a slight excess of silver nitrate. After shaking the samples for half an hour to establish equilibrium conditions, an aliquot of the sample was diluted with barium chloride to precipitate the carbonate as barium carbonate. The aliquot (carbonate-free NaOH) and the remaining sample (both NaOH and sodium carbonate present) were titrated with sulfuric acid to a phenylphthalein end point. The percent sodium carbonate was determined by difference.

Sodium formate percentage was determined by first treating the sample with zinc chloride and removing the interfering ions OH—, $CO_3=$ and CN— by filtration. The filtrate was buffered with glacial acetic acid, sodium acetate and mercuric chloride. Upon heating, the mercuric chloride was reduced by the sodium formate to mercurous chloride which was separated, dried and weighed. The percent sodium formate was then calculated.

TABLE 1

| | DIRECT ABSORPTION PILOT PLANT DATA SUMMARY | | | | | | |
|---|---|---|---|---|---|---|---|
| Run # | Liq. Temp °C. | Wt. % NaOH Starting | | Final Solution Composition | | | |
| | | Lbs | Wt. % | % NaCN | % NaOH | % $Na_2CO_3$ | % NaCOOH |
| 1 | 70 | 18.8 | 50 | 46.35 | 0.22 | 2.53 | 0.36 |
| 2 | 70 | 18.8 | 32 | 29.17 | 5.94 | 1.06 | 0.27 |
| 3 | 70 | 18.8 | 32 | 31.81 | 1.70 | 1.51 | 0.29 |
| 4 | 70 | 18.8 | 32 | 33.82 | 2.01 | 2.01 | 0.33 |
| 5 | 55 | 25.0 | 30 | 30.34 | 1.26 | 1.84 | 0.28 |
| 6 | 30 | 25.0 | 40 | 27.99 | 1.08 | 1.61 | 0.30 |
| 7 | 37 | 25.0 | 45 | 31.12 | 0.75 | 1.91 | 0.10 |
| 8 | 64 | 25.0 | 40 | 31.62 | 0.60 | 2.14 | 0.20 |
| 9 | 40 | 25.0 | 50 | 30.88 | 0.99 | 1.81 | 0.12 |
| 10 | 36 | 25.0 | 50 | 30.88 | 1.01 | 2.02 | 0.12 |
| 11 | 49 | 25.0 | 50 | 32.84 | 0.60 | 2.34 | 0.16 |
| 12 | 38 | 25.0 | 50 | 31.91 | 0.86 | 2.06 | 0.15 |

EXAMPLE 2

The NaCN solutions produced in Example 1 were crytallized in a laboratory crystallizer. The NaCN solution produced in Run 1 of Example 1 was chosen as representative of the runs for the purpose of this example. The laboratory crystallization facility consisted of an agitated four liter four-neck flask with an external heating mantle, two condensers, a condensate flask, and a vacuum pump. Crystallizations of Run 1 material were repeated three times according to the following procedure. Data in this example is the average of data obtained from the three crystallizations. About 1700 milliliters (ml) of NaCN solution was placed in the crystallizer. A feed flask was filled with 1000 ml of NaCN solution and fed to the crystallizer at a rate of 10 ml/min. The vacuum pump was started and the crystallizer was operated at about 90 mm Hg. Condensate exiting the crystallizer was condensed and collected in a condensate flask at about 7 ml/min. Sodium cyanide crystals were allowed to grow about one hour in the laboratory crystallizer. The concentration of precipitated solids in the crystallizer was about 15% by volume after crystallization was complete. The crystals were removed from the crystallizer and characterized for particle size distribution, filtration properties, chemical composition, and crystal morphology.

The particle size distribution was determined using standard Coulter counter particle size analysis known to those skilled in the art of crystallization. he particle size distribution is shown below.

| CHANNEL WIDTH (MICRONS) | VOLUME % IN CHANNEL |
| --- | --- |
| LESS THAN 64.0 | 0.0 |
| 64.0–80.6 | 0.1 |
| 80.6–101.6 | 0.9 |
| 101.6–128.0 | 3.1 |
| 128.0–161.3 | 8.0 |
| 161.3–203.2 | 17.0 |
| 203.2–256.0 | 28.8 |
| 256.0–322.6 | 27.0 |
| 322.6–406.4 | 9.7 |
| 406.4–512.0 | 5.0 |
| 512.0–645.1 | 0.4 |
| MORE THAN 645.1 | 0.0 |
| AVERAGE PARTICLE SIZE (50TH PERCENTILE) = 242.9 MICRONS | |

Filtration properties of the crystals was determined using standard filter leaf tests known to those skilled in the art. A standard 0.01 square foot filter leaf test was immersed in 600 ml of NaCN slurry from the laboratory crystallizer. Filtration tests were done at a pressure of 506 mm Hg, a five-second cake pick up time, a 1.5-inch cake thickness, and a cake dewatering time of 60 seconds. The wet filter cake was dried in an oven to determine cake moisture after dewatering. The specific cake resistance was calculated per normal procedures known to those skilled in the art. The percent cake moisture after dewatering was 17% and the specific cake resistance was $4.1 \times 10^7$ meters per kilogram (m/kg).

The NaCN slurry from the crystallizer was dewatered and dried in a vacuum oven to constant weight. The purity of the solid NaCN ranged from 84–92% NaCN which was analyzed by titration with silver nitrate.

The crystal morphology was determined using scanning electron microscopy. The crystals were filtered and washed with isopropanol to remove the mother liquor from the surface of the crystals. Based on the particle size distribution and crystal morphology, we would not expect any problems drying or briquetting the NaCN crystals.

EXAMPLE 3 (Control)

Sodium cyanide solution, from a working production installation which reacts pure 99.5% liquid hydrocyanic acid with NaOH was used in this experiment. The composition of the NaCN solution obtained from the production unit was:

SODIUM CYANIDE: 43.75 wt. %
SODIUM HYDROXIDE: 1.90 wt. %
SODIUM CARBONATE: 0.23 wt. %
SODIUM FORMATE: 1.06 wt. %
WATER: 53.06 wt. %

About 6000 ml of the NaCN solution was diluted to about 39% NaCN by adding about 615 ml of distilled water. The solution was diluted to eliminate the possibility of any small crystals being present. About 1700 ml of the 39% NaCN was placed in the same laboratory crystallizer discussed in Example 2. The feed flask was filled with 1000 ml of the NaCN solution. The NaCN was crystallized under the same conditions as Example 2. The crystals obtained were also characterized using the samemmethods. The particle size distribution for the crystals obtained was:

| CHANNEL WIDTH (MICRONS) | VOLUME % IN CHANNEL |
| --- | --- |
| LESS THAN 50.8 | 0.0 |
| 50.8–64.0 | 0.2 |
| 64.0–80.6 | 0.0 |
| 80.6–101.6 | 0.7 |
| 101.6–128.0 | 2.5 |
| 128.0–161.3 | 5.8 |
| 161.3–203.2 | 13.0 |
| 203.2–256.0 | 20.3 |
| 256.0–322.6 | 31.0 |
| 322.6–406.4 | 20.8 |
| 406.4–512.0 | 5.6 |
| 512.0–645.1 | 0.2 |
| MORE THAN 645.1 | 0.0 |
| AVERAGE PARTICLE SIZE (50TH PERCENTILE) = 272.2 MICRONS | |

The filtration properties of the crystals obtained were determined with the same procedures used in Example 2. The percent cake moisture after dewatering was 17% and the specific cake resistance was $2.6 \times 10^7$ m/kg.

Crystals from actual plant crystallizer, by comparison, had an average particle size of 109 microns, a cake moisture after dewatering of 21% and a specific cake resistance of $4 \times 10^7$ m/kg.

EXAMPLE 4

HCN converter gas of essentially the same composition as Example 1 was fed to the same batch absorber as Example 1. The absorber was initially charged with 25 pounds of 50 wt. % NaOH. The HCN converter gas was bubbled through the NaOH at about 30 pounds per hour. The cooling water flow was adjusted to maintain the liquid temperature in the absorber at about 78° C. Titrations for percent NaOH and NaCN were performed the same as in Example 1 to determine when the reaction was finished. About 3 gallons of NaCN slurry was drained from the absorber with the following composition.

SODIUM CYANIDE: 49.46%
SODIUM HYDROXIDE: 0.91%
SODIUM CARBONATE: 3.23%
SODIUM FORMATE: 0.56%

Filtration properties of the slurry were determined using the same procedures as Example 2. The percent cake moisture after dewatering was 20.9%. The specific cake resistance was found to be $8.9 \times 10^7$ m/kg.

The NaCN slurry was filtered, dried to constant weight in a vacuum oven and found to have a purity of about 89%. The particle size distribution of the slurry, measured with the Microtrac ® particle size analyzer, was:

| CHANNEL WIDTH (MICRONS) | VOLUME % IN CHANNEL |
| --- | --- |
| 3.3–4.7 | 6.6 |
| 4.7–6.6 | 1.2 |
| 6.6–9.4 | 1.3 |
| 9.4–13 | 0.8 |
| 13–19 | 1.6 |
| 19–27 | 6.2 |
| 27–38 | 10.9 |
| 38–53 | 14.3 |
| 53–75 | 17.7 |
| 75–106 | 20.0 |
| 106–150 | 13.6 |
| 150–212 | 2.7 |
| 212–300 | 2.4 |
| AVERAGE PARTICLE SIZE (50TH PERCENTILE) = 60.0 MICRONS | |

EXAMPLE 5

To detemrine whether NaCN produced by the process of this invention can effectively dissolve gold from ore, NaCN crystals made from Run 8 of Example 1 were compared to NaCN crystals made by dissolving pure HCN in pure NaOH in the actual plant. Sufficient 0.1 Normal NaOH was added to 340 ml of deionized water in a stirred beaker to raise the pH of the contents of the beaker from 5.7 pH to 10.6 pH. NaCN crystals (0.48 grams) made in the laboratory crystallizer from NaCN solution made in Run 8 was then added. A 0.0073 gram square of gold foil was immersed in the stirred beaker. Foil weights were measured after 1.5, 2.3 and 3.3 hours with the following results:

| TIME (HRS.) | FOIL WEIGHT (GRAMS) | % DISSOLVED |
| --- | --- | --- |
| 0.0 | 0.0073 | — |
| 1.5 | 0.0050 | 31.5 |
| 2.3 | 0.0037 | 49.3 |
| 3.3 | 0.0019 | 74.0 |

These results compared favorably to the same test run with plant material. Results were:

| TIME (HRS.) | FOIL WEIGHT (GRAMS) | % DISSOLVED |
| --- | --- | --- |
| 0.0 | 0.0099 | — |
| 1.33 | 0.0078 | 21.2 |
| 2.33 | 0.0054 | 45.5 |
| 3.16 | 0.0034 | 65.7 |

EXAMPLE 6 to 8

Examples 6, 7 and 8 have been prepared to illustrate how the processes described in FIGS. 1, 2 and 3, respectively, are envisioned as operating in a plant producing 5000 pounds per hour of NaCN crystals on a dry basis. Examples 6, 7 and 8 assume that by varying the gas ratios in an Andrussow HCN process, lower carbon dioxide concentrations in the synthesis gas leaving the converter can be achieved. The HCN synthesis gas, in each example, was assumed to have the following composition:

HYDROCYANIC ACID: 6.9 WT. %
WATER: 18.7 WT. %
AMMONIA: 1.1 WT. %
CARBON DIOXIDE: 1.1 WT. %
INERTS: 72.2 WT. %

EXAMPLE 6

Feeding the impure HCN synthesis gas to the plant described in FIG. 1 should result in the rates of material flow shown in Table 2. The Reference numerals in Table 2 correspond to the Reference numerals in FIG. 1. The absorber is controlled at 70° C. at 1 psig. and the crystallizer is controlled at 70° C. at 100 mm Hg. Dry NaCN crystal product was calculated to be 95.6 wt. % NaCN, 3.8 Wt. % $Na_2CO_3$, 0.2 wt. % NaOH and 0.4 wt. % NaCOOH.

EXAMPLE 7

Feeding the impure HCN synthesis gas to the plant described in FIG. 2 should result in the rates of material flow shown in Table 3. The Reference numerals in Table 3 correspond to the Reference numerals in FIG. 2. The absorber is controlled at 70° C. at 1 psig. and the crystallizer is controlled at 70° C. at 100 mm Hg. Dry NaCN crystal product was calculated to be 97.1 wt. % NaCN, 2.3 wt. % $Na_2CO_3$, 0.1 wt. % NaOH and 0.5 wt. % NaCOOH.

EXAMPLE 8

Feeding the impure HCN synthesis gas to the plant described in FIG. 3 should result in the rates of material flow shown in Table 4. The Reference numerals in Table 4 correspond to the Reference numerals in FIG. 3. The absorber-crystallizer operates at 87° C. at 1 psig. Dry NaCN crystal product was calculated to be 94.2 wt. % NaCN, 3.7 wt. % $Na_2CO_3$, 0.2 wt. % NaOH and 1.9 wt. % NaCOOH.

TABLE 2

CRYSTALLIZER WITH RECYCLE TO ABSORBER
BASIS: 5000 POUNDS/HOUR NaCN

| Ref. No. | Description | Feed Rates (Pounds Per Hour) | | | | | |
| --- | --- | --- | --- | --- | --- | --- | --- |
| | | Total | NaCN | $Na_2CO_3$ | NaOH | NaCOOH | $H_2O$ |
| 10 | Andrussow Synthesis Gas | 41,673 | — | — | — | — | 7,800 |
| 11 | Absorber Exit Gas | 33,935° | — | — | — | — | 2,958 |
| 12 | Caustic Soda Feed | 8,512 | — | — | 4,256 | — | 4,256 |
| 13 | Caustic to Cryst. Absorber | 8,512 | — | — | 4,256 | — | 4,256 |
| 14 | Caustic to Absorber | 8,677 | 291 | — | 4,036 | — | 4,350 |
| 15 | Absorber Circ. Liquor | 500,000 | — | — | — | — | — |

TABLE 2-continued
CRYSTALLIZER WITH RECYCLE TO ABSORBER
BASIS: 5000 POUNDS/HOUR NaCN

| Ref. No. | Description | Feed Rates (Pounds Per Hour) | | | | | |
|---|---|---|---|---|---|---|---|
| | | Total | NaCN | Na$_2$CO$_3$ | NaOH | NaCOOH | H$_2$O |
| 17 | Cooled Circ. Liquor | 491,327 | — | — | — | — | — |
| 18 | Cryst. Feed | 52,233 | 20,430 | 740 | 246 | 700 | 31,112 |
| 19 | Cryst. Water Vapor | — | — | — | — | — | 11,034 |
| 20 | Scrubber Water Vapor | — | — | — | — | — | 10,940 |
| 21 | Cryst. Condensate | — | — | — | — | — | 10,890 |
| 23 | Non-Condensible Gas | — | — | — | — | — | 50 |
| 24 | Filter Feed Slurry | 42,000 | 20,429 | 738 | 188 | 562 | 20,083 |
| 25 | Recycle Filtrate | 35,883 | 15,429 | 538 | 180 | 538 | 19,198 |
| 26 | Wet Crystals to Dryer | 6,117 | 5,000 | 200 | 8 | 24 | 885 |

TABLE 3
CLASSIFYING CRYSTALLIZER
BASIS: 5000 POUNDS/HOUR NaCN

| Ref. No. | Description | Feed Rates (Pounds Per Hour) | | | | | |
|---|---|---|---|---|---|---|---|
| | | Total | NaCN | Na$_2$CO$_3$ | NaOH | NaCOOH | H$_2$O |
| 10 | Andrussow Synthesis Gas | 41,673 | — | — | — | — | 7,800 |
| 11 | Absorber Exit Gas | 33,970 | — | — | — | — | 2,958 |
| 12 | 50% Caustic Feed | 8,386 | — | — | 4,193 | — | 4,193 |
| 13 | Caustic to Cryst. Absorber | 8,386 | — | — | 4,193 | — | 4,193 |
| 14 | Caustic to Absorber | 8,596 | 292 | — | 3,954 | — | 4,350 |
| 15 | Absorber Circ. Liquor | 500,000 | — | — | — | — | — |
| 17 | Cooled Circ. Liquor | 491,862 | — | — | — | — | — |
| 18 | Cryst. Feed | 83,734 | 33,840 | 1,520 | 410 | 2,035 | 45,929 |
| 19 | Cryst. Water Vapor | — | — | — | — | — | 11,044 |
| 20 | Scrubbed Water Vapor | — | — | — | — | — | 10,887 |
| 21 | Cryst. Condensate | — | — | — | — | — | 10,837 |
| 23 | Non-Condensible Gas | — | — | — | — | — | 50 |
| 24 | Filter Feed Slurry | 46,630 | 22,642 | 735 | 210 | 1,255 | 21,788 |
| 25 | Filtrate to Cryst. | 41,030 | 17,642 | 615 | 205 | 1,230 | 21,337 |
| 26 | Wet Cryst. to Dryer | 5,600 | 5,000 | 120 | 5 | 25 | 450 |
| 32 | Fine Cryst. Recycle | 67,000 | 28,880 | 1,400 | 335 | 2,010 | 34,435 |
| 34 | Cryst. Circ. Slurry | 2,500,000 | — | — | — | — | — |

TABLE 4
SIMULTANEOUS ABSORPTION AND CRYSTALLIZATION
BASIS: 5000 POUNDS/HOUR NaCN

| Ref. No. | Description | Feed Rates (Pounds Per Hour) | | | | | |
|---|---|---|---|---|---|---|---|
| | | Total | NaCN | Na$_2$CO$_3$ | NaOH | NaCOOH | H$_2$O |
| 4 | Andrussow Synthesis | 42,112 | — | — | — | — | 7,882 |

TABLE 4-continued
SIMULTANEOUS ABSORPTION AND CRYSTALLIZATION
BASIS: 5000 POUNDS/HOUR NaCN

| Ref. No. | Description | Total | NaCN | $Na_2CO_3$ | NaOH | NaCOOH | $H_2O$ |
|---|---|---|---|---|---|---|---|
| | Gas | | | | | | |
| 10 | Exit Gas to Flare | 45,158 | — | — | — | — | 13,842 |
| 5 | Caustic Soda Feed | 8,616 | — | — | 4,308 | — | 4,308 |
| 6 | Circ. Slurry | 1,000,000 | — | — | — | — | — |
| 7 | Filter Feed Slurry | 50,000 | 22,436 | 854 | 447 | 4,022 | 22,241 |
| 8 | Recycle Filtrate | 43,590 | 17,436 | 654 | 436 | 3,923 | 21,141 |
| 9 | Wet Cryst. to Dryer | 6,410 | 5,000 | 200 | 11 | 99 | 1,100 |

We claim:

1. A continuous process for production of anhydrous sodium cyanide crystals comprising:
   a. absorbing impure hydrogen cyanide Andrussow reactor gas containing oxides of carbon and water in an absorber, said absorber being a standard absorber in which the gas contacts a well mixed aqueous absorbing cyanide solution, said solution not containing a sodium carbonate removal aide and said solution containing a concentration of free sodium hydroxide that is high enough to absorb the hydrogen cyanide while preventing polymerization of the hydrogen cyanide but that is low enough to permit sodium carbonate formed by the reaction of oxides of carbon with the sodium hydroxide to react with the hydrogen cyanide, at a temperature of about 30° C. to 80° C. at about atmospheric pressure to produce a sodium cyanide solution, then
   b. feeding the sodium cyanide solution to an evaporative crystallizer operating at a temperature of 50° to 90° C. and a pressure of 40 to 300 mm Hg to produce a slurry of NaCN crystals in mother liquor, then
   c. separating the NaCN crystals and the mother liquor from the slurry and recycling at least a part of the mother liquor to the absorber.

2. The process of claim 1 wherein the hydrogen cyanide in the vapor from the evaporative crystallizer is absorbed and recycled to the absorber.

3. The process of claim 1 wherein at least a part of the mother liquor separated from the NaCN crystal product is recycled through the evaporative crystallizer to the absorber, the evaporative crystallizer being a classifying crystallizer having a vaporizing section and a classifying section, the classifying section being designed to separate smaller crystals containing solid-phase sodium carbonate from the larger NaCN crystal product, the smaller crystals being returned to the absorber as a slurry with the mother liquor recycled through the evaporative crystallizer.

4. The process of claim 1 wherein the concentrastion of free sodium hydroxide in the absorbing cyanide solution is controlled to not fall below 0.1 weight. percent.

5. The process of claim 4 wherein the concentration of free sodium hydroxide is controlled between 0.1 and 3 weight percent.

6. The process of claim 5 wherein the concentration of free sodium hydroxide is controlled between 0.1 and 0.5 weight percent.

7. A continuous process for production of anhydrous sodium cyanide crystals comprising
   a. absorbing impure hydrogen cyanide Andrussow reactor gas containing oxides of carbon and water in aqueous sodium hydroxide in an absorber-crystallizer containing a circulating crystal slurry with simultaneous evaporation and crystallization, in which the gas contacts a well mixed aqueous absorbing solution, said solution not containing a sodium carbonate removal aide and said solution containing a concentration of free sodium hydroxide that is high enough to absorb the hydrogen cyanide while preventing polymerization of the hydrogen cyanide but that is low enough to permit sodium carbonate formed by the reaction of oxides of carbon with the sodium hydroxide to react with the hydrogen cyanide and
   b. separating the sodium cyanide crystals and mother liquor from the slurry and
   c. recycling the mother liquor to the absorber-crystallizer.

* * * * *